United States Patent [19]

Urech et al.

[11] Patent Number: 4,760,234
[45] Date of Patent: Jul. 26, 1988

[54] METHOD AND APPARATUS FOR CONNECTING A HOLLOW MEMBER TO AN INNER MEMBER

[75] Inventors: Werner Urech, Kaiserstuhl, Switzerland; Howard F. Gordon, Wilton, Conn.

[73] Assignee: Elpatronic AG, Switzerland

[21] Appl. No.: 943,641

[22] Filed: Dec. 17, 1986

[30] Foreign Application Priority Data

Dec. 20, 1985 [CH] Switzerland ............... 05452/85

[51] Int. Cl.⁴ ............................................. B23K 11/06
[52] U.S. Cl. ......................................... 219/83; 219/81; 219/117.1
[58] Field of Search ............ 219/81, 82, 83, 117.1, 219/78.01

[56] References Cited

U.S. PATENT DOCUMENTS

| | | | |
|---|---|---|---|
| 977,711 | 12/1910 | Craven | 219/81 |
| 2,444,833 | 7/1948 | Lampert | 219/83 |
| 3,832,516 | 8/1974 | Baker | 219/81 |
| 4,476,371 | 10/1984 | Schreiber | 219/81 |

Primary Examiner—Clifford C. Shaw
Attorney, Agent, or Firm—McCormick, Paulding & Huber

[57] ABSTRACT

For connecting a round hollow member (10) of sheet metal tightly to a complementary inner member (12), a force fit is produced in a narrow annular region (25) between these two members (10, 12). Then at least two electrodes (90) are applied to the hollow member (10) from the outside in the annular region and during relative rotation between the electrodes (90) on the one hand and the two members (10, 12) on the other hand, electrical resistance welding is carried out during which the welding current (I) is supplied and drawn off exclusively through the electrodes (90) bearing externally against the hollow member (10).

18 Claims, 6 Drawing Sheets

METHOD AND APPARATUS FOR CONNECTING A HOLLOW MEMBER TO AN INNER MEMBER

The invention relates to a method for connecting a round hollow member of sheet metal tightly to a complementary inner member, these two members being pushed one inside the other along a common axis.

Such a method is used, for example, during the production of liquid containers for camping cooking appliances, blow-lamps and the like. In the course of this, inserted in a deep-drawn hollow member of sheet metal is a bottom, likewise consisting of sheet metal and curved towards the interior of the hollow member, and the two are connected to one another in that their edges are crimped over outwards. This method only leads to a generally sufficiently tight connection when the thickness of the sheet metal of the inner member is at least substantially equal to that of the hollow member. Difficulties arise in such applications, inter alia when the inner member has to be thicker than the hollow member for reasons of strength.

This applies, for example, to the housings of oil filters for motor vehicle engines. Such housings likewise consist of a deep-drawn hollow member of sheet metal and a bottom which forms the associated inner member. The bottom on the one hand carries an elongated, multi-part filter which extends to within the vicinity of the closed end of the hollow member and on the other hand is adapted for securing the filter to the housing of an oil pump; the inner member therefore consists of a metal plate which is thicker by a multiple than the sheet metal of the hollow member and therefore cannot be connected to this directly by folding. Hitherto it has been usual to make the locked-seam connection between the hollow member of thin sheet metal and an intermediate ring consisting of equally thin sheet metal which has previously been welded to the thick plate. A seal is inserted between the two metal sheets before the folding. This known method is complicated and accordingly expensive and, like every comparable folding process, presupposes that the two members which are to be connected to one another have edges projecting sufficiently far out so that there is sufficient room for folding tools both at their radially inner side and at their outside. The fold produced in this manner encloses a space which in many cases cannot be used.

It is therefore the object of the invention to develop further a method of the type described at the beginning in such a manner that a reliably tight and firm connection between hollow member and inner member is formed with less work involved and this connection has smaller space requirements than known locked-seam connections.

According to the invention, this problem is solved in that a force fit is produced in a narrow annular region between the two members, then at least two electrodes are applied to the hollow member in the annular region from the outside and with relative rotation between the electrodes on the one hand and the two members on the other hand, electric resistance welding is carried out during which the welding current is supplied and drawn off exclusively through the electrodes bearing against the hollow member at the outside.

Astonishingly, it has been found that the welding current does not flow or only flows to an insignificant extent directly through the hollow member from one electrode to the other. The force fit produced in a narrow annular region and the pressure exerted by the electrodes in the usual manner during resistance welding ensure that the welding current flows through both members and produces a weld in the region of each electrode without the inner member being directly touched by an electrode.

The method according to the invention has proved particularly satisfactory in the production of oil-filter housings of the type described; it is also suitable, however, for welding tubes together, for example, in which case it may be necessary to support that tube which forms the inner member, mechanically by an inserted mandrel. In any case, what is important is that it is not necessary to connect the inner member to one pole of a current source through an electrode resting against it.

The annular region preferably has a width of the order of magnitude of one to three times the thickness of the sheet metal of the hollow member. Such a width of the annular region, which in any case is very narrow in relation to the diameter of the hollow member, provides favourable conditions for a uniform heating of the hollow member and of the inner member at the welding positions.

Working in the same sense the further preferred measure, that the hollow member is expanded beyond its elastic limit during the production of the force fit. This may appropriately be effected in that an annular rib is formed on the inner member and produces the force fit when the two members are pushed one inside the other.

It is a further advantage if the hollow member is deformed radially inwards in an end region engaging over the annular rib, after the production of the force fit and before the welding. As a result, the inner member is reliably prevented from being displaced in relation to the hollow member if this expands under the influence of the welding heat.

The method carried out with the annular rib on the inner member can be further developed, according to the invention, in that a centring shoulder is formed on the inner member in front of the annular rib and fits into the hollow member with slight clearance, and the annular rib has a profile which rises gradually from the centring shoulder.

It is a particular advantage if the electrodes are rolled on the hollow member during the resistance welding as is known per se during electric resistance roller seam welding.

The welding is preferably carried out in two stages in such a manner that with an initial relative rotation between the two members on the one hand and the electrodes on the other hand, the welding current is repeatedly switched on and off as a result of which the two members are at first only tacked together and then, with continued relative rotation, the welding current remains switched on for the production of a tight welding seam.

A particularly rapid mode of operation is possible if the resistance welding is carried out with three electrodes which are fed with three-phase current. In this case, it is sufficient for the tacking and subsequent sealing weld if the initial and continued relative rotations, are each executed over about 120°

It is further the object of the invention to provide an apparatus for carrying out the method according to the invention.

According to the invention, such an apparatus is characterised by a holding means for a hollow member with inserted inner member, which holding means is rotatable about an axis of rotation coinciding with their common axis, at least two electrodes which, in the operating position are disposed at least substantially parallel to and symmetrically with the axis of rotation of the holding means, a feed drive for a relative movement between the holding means and the electrodes, by means of which movement the annular region with the force fit comes between the electrodes, and a rotary drive for the relative rotation between the electrodes on the one hand and the hollow member with inserted inner member on the other hand.

Advantageous further developments of the apparatus according to the invention are described in the claims 12 to 18.

One example of embodiment of the invention is explained below with further details, with reference to diagrammatic drawings.

The purpose of the apparatus illustrated is to join each hollow member 10 to an inner member 12 to form a sealed housing. The hollow members 10 are cylindrical deep-drawn parts with a circular cross-section and an internal diameter of 94 mm for example, made of steel sheet 0.5 mm thick for example. The inner members 12 are circular steel plates with a maximum external diameter of 95 mm for example and a thickness of 6 mm for example. Secured to each inner member 12 is a filter 14 which corresponds in construction and size, to conventional oil filters for motor vehicle engines. The inner member 12 has a central tapped bore 16 and a plurality of apertures 18 disposed round this. Disposed between the apertures 18 and the filter 14 is a valve plate 20 of resilient plastics material or rubber.

During the usual mode of operation of such a filter device, engine oil is pumped through the apertures 18 in the inner member 12 into the sealed housing formed by this and the hollow member 10; the engine oil flows through the filter 14 and deposits impurities on the outside thereof to flow away, purified, through the tapped bore 16. The valve plate 20 prevents a flow in the opposite direction.

For use of the filter device, the inner member is screwed, by its tapped bore 16, onto a corresponding threaded socket which is disposed on or near to the cylinder block of an internal combustion engine. In operation, the filter device is exposed to vibration which results from engine vibration and from the motor vehicle travelling over an uneven roadway; when such vibration occurs, the connection between hollow member 10 and inner member 12 is heavily loaded particularly as considerable bending moments develop as a result of the fact that the centre of gravity of the hollow member 10 and of the filter 14 is comparatively far from the inner member 12. The connection between hollow member 10 and inner member 12 must withstand this loading for a long time and at the same time remain completely sealed.

In order to produce a connection which meets these requirements, the inner member 12 is provided, at its circumference, with an annular rib 22 and a centring shoulder 24 disposed in front of this. The annular rib 22 has a trapezoidal section with one side rising from the centring shoulder 24 at an angle of 45° for example and a comparatively narrow width which is only about 1 mm at its outside. The hollow member 10 has a slightly widened rim which can easily be placed over the centring shoulder 24 and can then be pushed over the annular rib 22 by using a greater axial force, in the course of which it expands and forms a force fit with the inner member 12 in an annular region 25 which, in accordance with the annular rib 22, is only about 1 mm wide. Hollow member 10 and inner member 12 are subsequently welded together in the region of this annular region 25.

Figure 1:
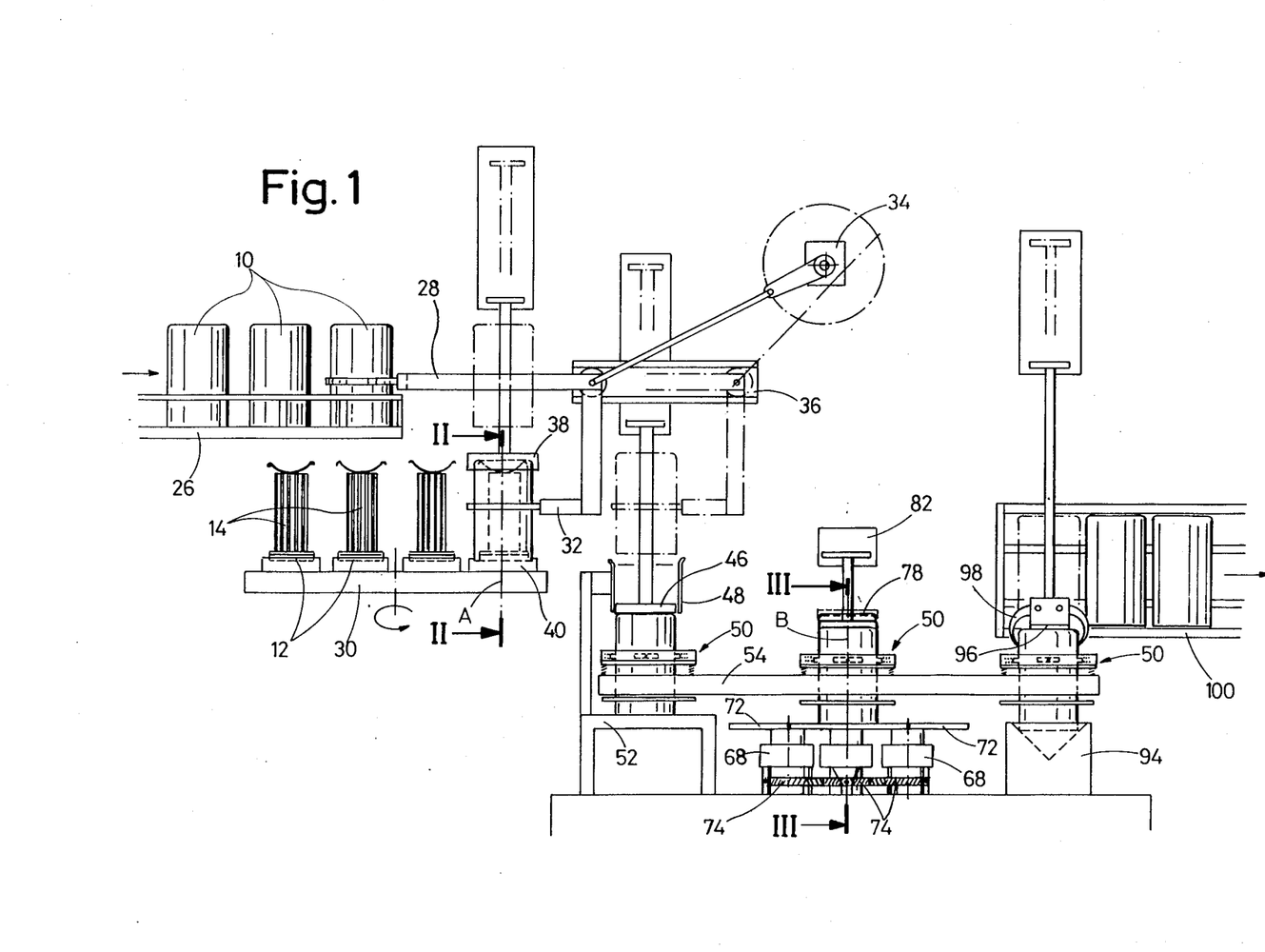
FIG. 1 shows a side view of an apparatus for the tight closing of filter housings.

These operations are carried out by the apparatus illustrated in FIG. 1 with an upper conveyor 26 for empty hollow members 10, an upper gripper 28 to remove one of these hollow members at a time and a lower conveyor 30 for inner members 12, each with a filter 14 secured thereto together with associated valve plate 20. Associated with the lower conveyor 30 is a lower gripper 32; both grippers 28 and 32 can be reciprocated, by a common gripper drive 34, along a horizontal guide 36, between a removal position and a delivery position. In FIG. 1, the two grippers 28 and 32 are shown in their removal position in full lines and in their delivery position in chain lines. The lower gripper 32 is offset in relation to the upper gripper 28, in the direction of its removal position, by a distance which coincides with the travel distance of the two grippers.

Figure 2:
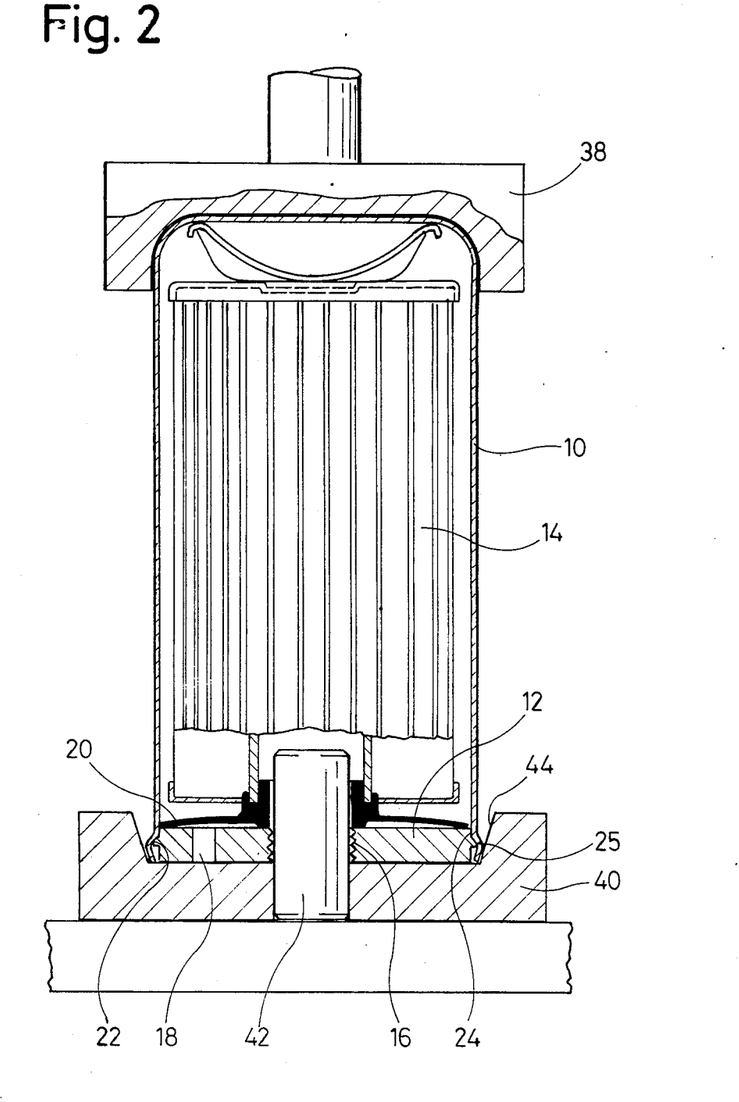
FIG. 2 shows the vertical partial section II—II in FIG. 1.

During each work cycle, the upper gripper 28 brings a hollow member 10 from the upper conveyor 26 into a position below a first ram 38. This pushes the hollow member 10 onto an inner member 12 which is lying on a die 40 disposed vertically below the ram 38 and is centred by a pin 42 secured to this. While the hollow member 10 is being pushed onto the inner member 12, the force fit described results in the annular region 25 and the marginal region of the hollow member 10 pushed beyond the annular rib 22 is swaged inwards by a wall 44, narrowing downwards in a taper, of the die 40, as illustrated in FIG. 2.

In the meantime, the two grippers 28 and 32 have returned to their removal position; the lower gripper 32 now grasps the filter device pre-assembled in this manner and moves with it into its delivery position vertically below a second ram 46 which now forces the filter device through a stationary guide 48 into a holding means 50 until the inner member 12 strikes against a stationary stop 52. Hollow member 10 and inner member 12 of the pre-assembled filter device have a common axis A, which coincides with the vertical axis B of the holding means 50.

The holding means 50 is one of four like holding means which are disposed at angular distances apart of 90° on a rotary table 54. Each of the holding means 50 has a flange ring 56 which is rotatable, in a recess in the rotary table 54, about the vertical axis B. A bush 58 is guided for displacement along the axis B in the flange ring 56. A plurality of clamping members 60, which are offset in relation to one another at equal angular distances are guided for radial displacement round the axis B in the bush 58 and are each biased towards the axis B by a mechanical preloading device illustrated in simplified form as a spring 62 in FIG. 3. The bush 58 is biased axially upwards on the flange ring 56 by springs 64 so that it can only be moved downwards by a pressure exerted on the hollow member 10.

After a rotation of the rotary table 54 through 90°, the holding means 50, into which the second ram 46 has pushed a filter device, reaches a position in which the axis B of the holding means 50, coinciding with the common axis A of hollow member 10 and inner member 12, is situated centrally between three stationary bearing blocks 66 which are disposed round this axis, offset by 120° in relation to one another. An electrode support 68 is mounted for pivoting about a horizontal pivot axis C on each of the bearing blocks 66. Mounted in each of the three electrode supports 68 is a shaft 70 which is vertical in the operating position and to which an electrode roller 72 is secured at the top and a drive wheel 74 at the bottom. The three drive wheels 74 have curved teeth and mesh with a common central wheel 76 which likewise has curved teeth. The curved teeth of the wheels 74 and 76 have a common central plane E in which the pivot axes C also lie.

Disposed vertically above the central wheel 76 is a third ram 78 which comprises a rotatably mounted ring 80 to act on the upper end face of the hollow member 10 standing beneath it. The ram 78 can be moved up and down by means of a feed drive 82 in the form of a pneumatic piston-cylinder unit.

Figure 3:
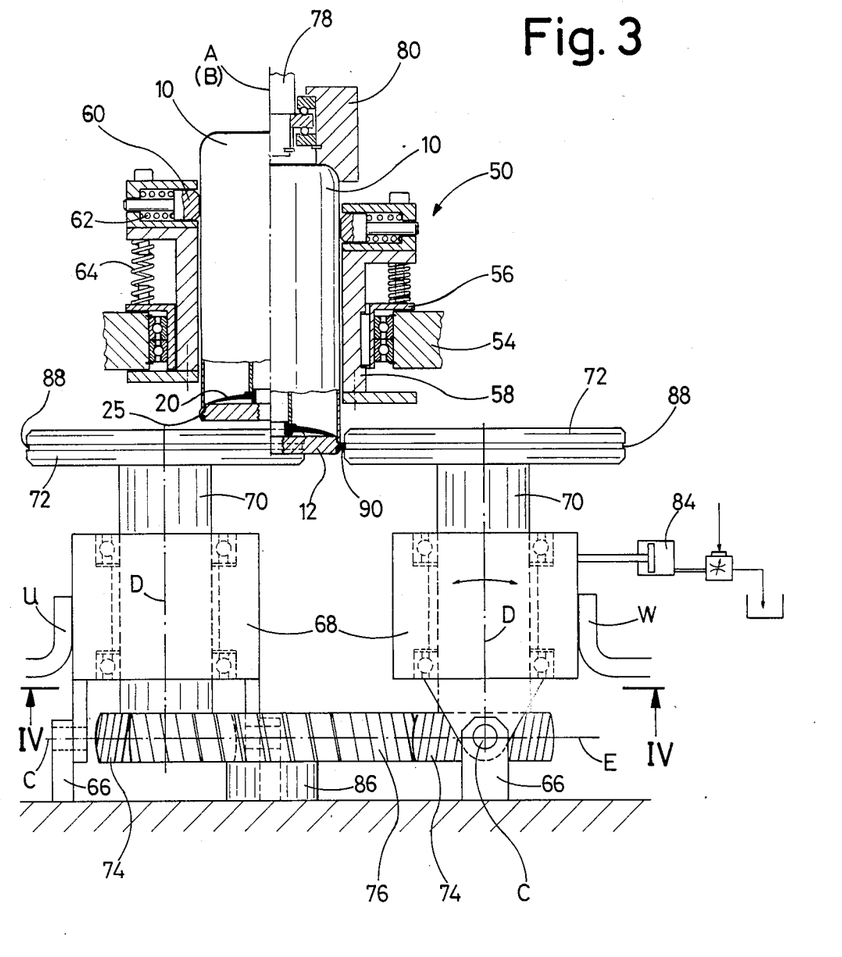
FIG. 3 shows the vertical partial section III—III in FIG. 1.
Figure 4:
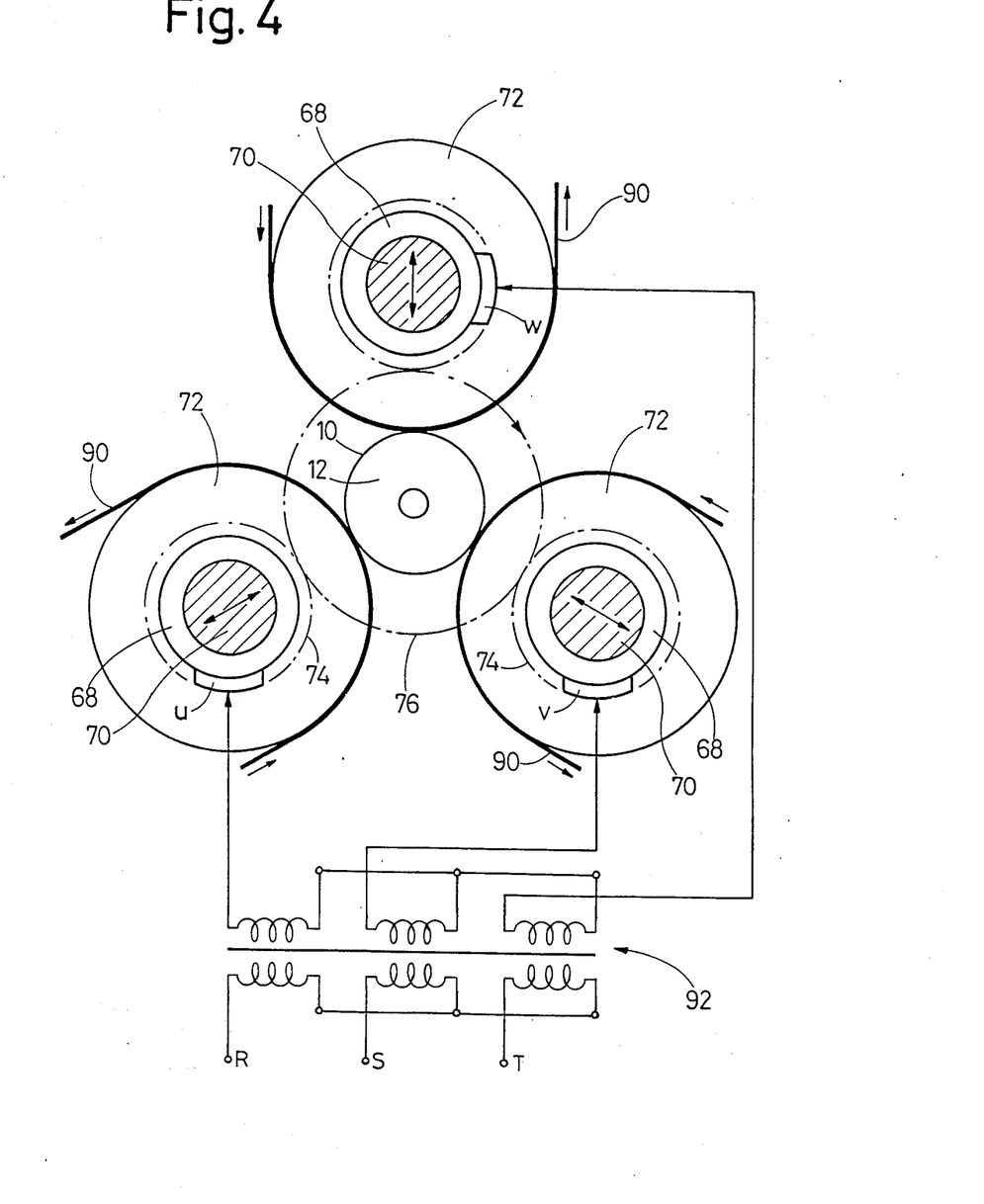
FIG. 4 shows the horizontal section IV—IV in FIG. 3.

In FIG. 3, the filter device is illustrated at the left-hand side of the common axis A in its conveying position in which it can be moved away over the electrode rollers 72. By lowering the ram 78, the filter device together with the holding means 50 mounting it for rotation, can be brought into a working position which is illustrated on the right of the common axis A in FIG. 3. In the working position, the annular region 25 is disposed at the height of the electrode rollers 72; these are at first pivoted slightly outwards without the toothed engagement between the drive wheels 74 and the central wheel 76 being interrupted.

Associated with each of the electrode supports 68 is a pivot drive 84 for pivoting about the associated pivot axis C. The pivot drives 84 are now actuated so that the three electrode rollers 72 are pivoted towards the annular region 25. As soon as the electrode rollers 72 have reached their operating position illustrated in FIG. 3, a rotary drive 86 is switched on and sets the three electrode rollers 72 in rotation in the same direction through the central wheel 76 and the drive wheels 74.

Each of the electrode rollers 72 has an annular groove 88; guided in this is a wire electrode 90 which projects slightly out of the annular groove 88 and bears, with a pressure produced by the pivot drive 84, against the annular region 25 so that the hollow member 10, and with it the whole pre-assembled filter device, is also set in rotation. A transformer 92 is provided for the welding, the primary connections R, S and T of which are connected to a three-phase supply network and the secondary connections U, V and W of which are each connected to one of the three electrode supports 68. Each of the electrode supports 68 is connected, through an electrically conducting liquid contained therein, to the associated electrode roller 72.

Figure 6:
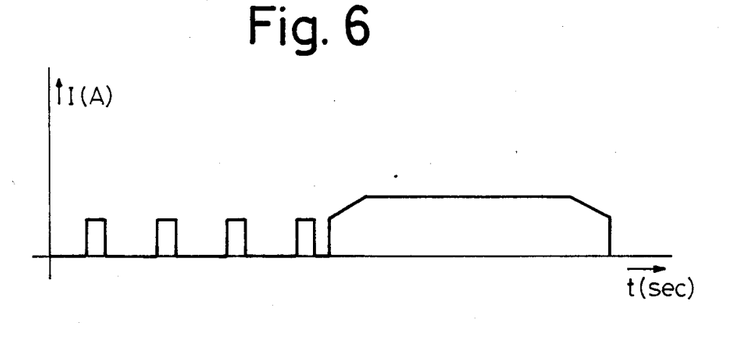
FIG. 6 shows a welding current diagram.

The course of the current during the welding of the hollow member 10 to the associated inner member 12 is illustrated in FIG. 6. During a rotation of the filter device together with the holding means 50 through about 120°, the current is switched on four times so that the hollow member 10 is tacked to the inner member 12 by each of the three wire electrodes 90 at four places, that is to say at 12 places altogether. During a further rotation through about 120°, the current remains switched on as a result of which the hollow member 10 is welded to the inner member 12 in the whole annular region 25. At the inner member 12, only its annular rib 22 is affected by the welding because only in the annular region 25 round this annular rib is the resistance to the passage of current slight. A firm and completely impervious welding seam is formed in this annular region 25.

As soon as the welding seam is finished, the electrode rollers 72 are pivoted away from one another. Then the ram 78 releases the hollow member 10 so that the holding means 50 together with the filer device is lifted back into the conveying position by the springs 64. The rotary table 54 is then turned through a further 90° so that the welded filter device comes to a stop above a further tapered die 94. Disposed above the die 94 is a fourth ram 96 which forces the filter device into the die so that the lower edge of the hollow member 10, which may have gone somewhat wavy during the welding, is pressed firmly against a lower marginal region of the inner member 12.

Finally, the now finished filter device is grasped by pincers 98 mounted on the ram 96, lifted and deposited on a conveyor 100.

Figure 5:
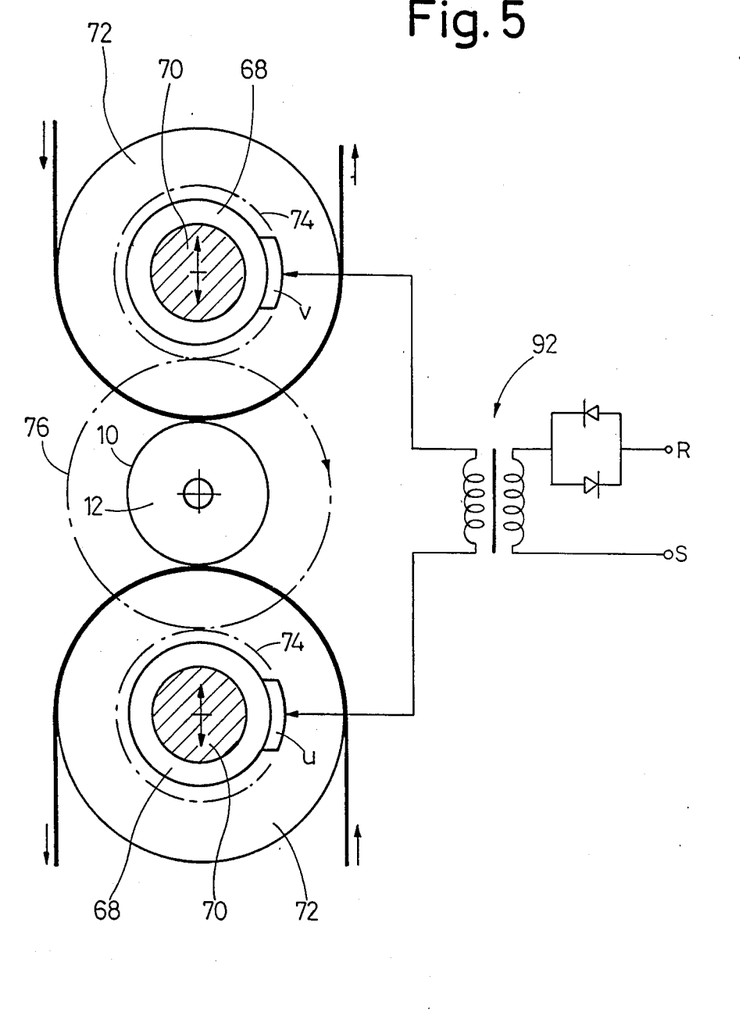
FIG. 5 shows a modification of FIGS. 1 to 4.

The modification illustrated in FIG. 5 differs from the one hitherto described in that there are only two electrode rollers 72 for the welding and these are disposed diametrically opposite one another. The associated transformer 92 is an alternating-current transformer. With this arrangement, half a revolution of the filter device is necessary in each case for the tacking and for the seal welding.

We claim:

1. A method of fabricating a workpiece comprised of a round hollow member of sheet metal and a substantially thicker complementary inner member positioned one inside the other along a common axis, comprising the steps of:
   assembling the members such that a force fit is produced in a narrow angular region therebetween, forming an assembly;
   rotating a plurality of electrodes applied against an outer surface of the hollow member such that said assembly rotates, said electrodes contacting only the outer hollow member; and
   applying electrical current to the electrodes to flow exclusively between the electrodes, by way of the thicker inner member and that portion of the hollow member registered therebetween.

2. A method as claimed in claim 1 characterised in that the annular region (25) has a width in the order of magnitude of one to three times the thickness of the sheet metal of the hollow member (10).

3. A method as claimed in claim 1, characterised in that the hollow member (10) is expanded beyond its elastic limit during the production of the force fit.

4. A method as claimed in claim 3, characterised in that an annular rib (22) is formed on the inner member (12) and produces the force fit when the two members (10, 12) are pushed one inside the other.

5. A method as claimed in claim 4, characterised in that, after the production of the force fit and before the welding, the hollow member is deformed radially inwards in an end region engaging over the annular rib (22).

6. A method as claimed in claim 4, characterised in that a shoulder for centering said members (24) is formed on the inner member (12) in front of the annular rib (22) and fits with slight clearance in the hollow member (10), and the annular rib (22) has a profile rising gradually from the centring shoulder (24).

7. A method as claimed in claim 1, characterised in that the electrodes (90) are rolled on the hollow member (10) during the resistance welding.

8. A method as claimed in claim 1, wherein during said rotating step, the welding current (I) is repeatedly switched on and off as a result of which the two members (10, 12) are at first only tacked together and then, during continued relative rotation, the welding current (I) remains switched on to produce a sealed welding seam.

9. A method as claimed in claim 1, characterised in that the resistance welding is carried out with three electrodes (90) which are fed with three-phase current.

10. A method as claimed in claim 8, characterised in that the initial and the continued relative rotation are each effected through approximately 120°.

11. An apparatus for connecting a round hollow member (10) of sheet metal tightly to a substantially thicker complementary inner member (12), the complementary member being inserted within the hollow member along a common axis, characterized by,
   a holding means (50) for holding the hollow member (10) with the inserted inner member (12), which holding means is rotatable about an axis of rotation (B) coinciding with the common axis (A),
   at least two electrodes (90) which, in the operating position, bear against an outer surface of said hollow member and are disposed at least substantially parallel to and symmetrically with respect to the axis of rotation (B) of the holding means (50) said electrode contacting only the outer hollow member and configured to supply said draw-off welding current substantially through said inner member and that portion of the hollow member registered therebetween,
   a feed drive (82) for a relative movement between the holding means (50) and the electrodes (90), as a result of which movement an annular region (25) with a force fit between the members is positioned between the electrodes (90), and
   a rotary drive (86) for producing relative rotation between the electrodes (90) on the one hand and the hollow member (10) with the inserted inner member (12) on the other hand.

12. An apparatus as claimed in claim 11, characterized in that at least one of the electrodes (90) is radially moveable towards the axis of rotation (B) of the holding means (50).

13. An apparatus as claimed in claim 12, characterised in that associated with each of the electrodes (90) is an electrode roller (72) which is mounted in an electrode support (68) which is pivotable about a pivot axis (C) which extends with spacing transversely to the axis of rotation (B) of the holding means (50).

14. An apparatus as claimed in claim 13, characterised in that each of the electrode rollers (72) is connected to a drive wheel (74) which, at least in the operating position of the electrode rollers (72) is in engagement with a central wheel (76) which is associated jointly with the drive wheels (74) and is connected to the rotary drive (86).

15. An apparatus as claimed in claim 14, characterised in that the pivot axes (C) of all the electrode supports (68) lie in a common central plane (E) of the said wheels (74, 76).

16. An apparatus as claimed in claim 13, characterised in that the electrode rollers (72) each have an annular groove (88) in which a wire electrode (90) is guided.

17. An apparatus as claimed in claim 11, characterised in that three electrodes (90) are disposed at distances apart of 120° round the axis of rotation (B) of the holding means (50) and are each connected to one phase (U, V, W) at the secondary side of a three-phase current transformer (92).

18. An apparatus as claimed in claim 1, characterized in that the holding means (50) includes a bush (58) which comprises clamping members (60) to hold the hollow member (10), said holding means reciprocated axially between a conveying position and a welding position by the feed drive (82).

* * * * *